US006129332A

United States Patent [19]

Düsterhöft

[11] Patent Number: 6,129,332

[45] Date of Patent: Oct. 10, 2000

[54] HYDRAULIC PLUNGER VALVE

[75] Inventor: Martin Düsterhöft, Aachen, Germany

[73] Assignee: FEV Motorentechnik GmbH, Aachen, Germany

[21] Appl. No.: 09/299,725

[22] Filed: Apr. 27, 1999

[30] Foreign Application Priority Data

| | | | |
|---|---|---|---|
| Apr. 27, 1998 | [DE] | Germany | 298 07 601 |
| Mar. 19, 1999 | [DE] | Germany | 199 12 350 |

[51] Int. Cl.[7] .............................. F16K 31/12; F16K 31/02

[52] U.S. Cl. ......................... 251/28; 251/30.01; 251/63.5; 251/129.07; 251/129.14; 251/282

[58] Field of Search ................................ 251/30.01, 282, 251/28, 63.5, 129.07, 129.14

[56] References Cited

U.S. PATENT DOCUMENTS

| | | | |
|---|---|---|---|
| 4,796,667 | 1/1989 | Kehl et al. | 251/282 |
| 4,809,746 | 3/1989 | Wolfges | 251/30.01 |
| 4,909,440 | 3/1990 | Mitsuyasu et al. | 251/129.07 |
| 5,248,123 | 9/1993 | Richeson et al. | 251/30.01 |
| 5,297,777 | 3/1994 | Yie | 251/282 |
| 5,395,090 | 3/1995 | Rosaen | 251/28 |
| 5,467,797 | 11/1995 | Seetharaman et al. | 251/129.14 |
| 5,615,594 | 4/1997 | Duckinghaus | 251/129.14 |
| 5,687,682 | 11/1997 | Rembold et al. | 123/179.3 |
| 5,803,429 | 9/1998 | Tsuzuki et al. | 251/30.01 |

*Primary Examiner*—Kevin Shaver
*Assistant Examiner*—Eric Keasel
*Attorney, Agent, or Firm*—Venable; Gabor J. Kelemen

[57] ABSTRACT

A hydraulic control valve includes a valve housing defining a valve chamber having first and second axially spaced valve seats of identical diameters, a control cylinder and first and second end cylinders. The valve chamber, the control cylinder and the first and second end cylinders are axially arranged in a series and form a cavity. A first pressure conduit communicates with the control cylinder, a second pressure conduit communicates with the first end cylinder, a third pressure conduit communicates with the second end cylinder; a control conduit communicates with control cylinder; and a discharge conduit communicates with the valve chamber. A plunger body is accommodated in the cavity and is composed of a valve body disposed in the valve chamber for being selectively seated in the valve seats, a control piston disposed in the control cylinder, a first support piston disposed in the first end cylinder and exposed to pressure from the second pressure conduit and a second support piston disposed in the second end cylinder and exposed to pressure from the third pressure conduit. The valve body, the control piston and the first and second support pistons constitute loosely axially serially disposed separate plunger body segments having different geometrical shapes dependent on functions thereof. A closing spring supports the second support piston and urges the valve body towards one of the valve seats.

12 Claims, 7 Drawing Sheets

HYDRAULIC PLUNGER VALVE

BACKGROUND OF THE INVENTION

In numerous technological fields high-pressure hydraulic systems have to perform, via setting means, switching operations which directly affect the pressure medium. Because of the high pressure, it is, as a rule, not possible to directly control the setting means and therefore a servocontrol circuit has to be provided which switches the setting means via a hydraulic control valve with a small part of the pressure fluid acting as a servo flow, whereby very short switching times may be obtained.

An accurate control of the servoflow is indispensable for a good reproducibility of the operation of the setting means. A particularly superior control is obtained if the hydraulic control valve is pressure-equalized. Such control valves are known as plunger valves or plunger seat valves. It is a disadvantage of the conventional plunger valves that a relatively long sealing portion on the plunger body has to be provided between the control edges of the valve. For this reason, plunger valves which are to be operated only with small valve strokes of, for example, 50 μm, cannot be used in a high-pressure environment where the pressure is 1000 bar and more.

Instead of plunger valves, plunger seat valves may be used which do not have the above-outlined disadvantage because the supply and/or removal of fluid concerning the pressurized fluid to be controlled is sealed in the corresponding switching states by one or more valve seats in the valve chamber. A disadvantage of known plunger seat valves, however, is seen in their high manufacturing costs, particularly those involved with the required grinding and polishing steps.

German Patent document 27 56 008 describes an electrically switchable fuel valve which includes a plunger component composed of a plurality of individual bodies. The individual bodies are held together by two oppositely directed springs since the individual bodies are not guided separately. Such a valve, however, is usable only for low pressures and is not pressure-equalized with respect to the plunger part.

U.S. Pat. No. 4,628,881 describes a pressure-amplifying fuel injector which comprises two valve balls. The fuel which is initially pressurized (for example, to 100 bar) is amplified by means of a stepped piston to a high injection pressure of approximately 1500 bar. The charging of the driving piston is effected by means of a 3/2-way valve. A drainage chamber is positioned directly behind the second valve ball, and thus the valve cannot be pressure-equalized at any time. For opening the valve, the electromagnet has to displace the valve balls against the large forces derived from the preliminarily pressurized fluid. The connecting rod between the individual valve components is not guided in the region of the valve seats, because at that region the fuel must pass through the valve. The valve balls are held together only by the preliminary pressure of the fuel; no further spring is provided. Such a construction does not ensure in all operating points a safe, reliable operation of the valve. At least at operation start, that is, upon build-up of the preliminary pressure, the valve needs time until the first valve ball finds its seat and seals. In the open position of the valve the first valve ball is exposed to the preliminary pressure at all sides and thus it floats in the fuel stream substantially without force effect and may thus be separated from the connecting bar.

SUMMARY OF THE INVENTION

The invention pertains more particularly to a hydraulic control valve which has a housing that defines a valve chamber having two valve seats, a control cylinder as well as opposite end cylinders for receiving respective support pistons. The valve has a supply conduit and a discharge conduit which, for affecting the pressurized fluid to be controlled, open into the valve chamber and further, respective pressure conduits merge into the cylinders for the support pistons, while a control conduit merges into the control cylinder. The valve further has a plunger body supported for reciprocation which has, as viewed in the direction of motion, in a serial arrangement, a valve body, a control piston and flanking support pistons. One support piston is countersupported by a closing spring which holds the valve body of the plunger body against a valve seat in the valve chamber.

It is an object of the invention to provide an improved hydraulic control valve of the above-outlined type from which the discussed disadvantages are eliminated.

This object and others to become apparent as the specification progresses, are accomplished by the invention, according to which, briefly stated, the hydraulic control valve includes a valve housing defining a valve chamber having first and second axially spaced valve seats of identical diameters, a control cylinder and first and second end cylinders. The valve chamber, the control cylinder and the first and second end cylinders are axially arranged in a series and form a cavity in the housing. A first pressure conduit communicates with the control cylinder, a second pressure conduit communicates with the first end cylinder, a third pressure conduit communicates with the second end cylinder, a control conduit communicates with the control cylinder, and a discharge conduit communicates with the valve chamber. A plunger body is accommodated in the cavity and is composed of a valve body disposed in the valve chamber and being selectively seatable in the first or second valve seat, a control piston disposed in the control cylinder, a first support piston disposed in the first end cylinder and exposed to pressure from the second pressure conduit and a second support piston disposed in the second end cylinder and exposed to pressure from the third pressure conduit. The valve body, the control piston and the first and second support pistons constitute loosely axially serially disposed separate plunger body segments having different geometrical shapes dependent on functions thereof. A closing spring supports the second support piston and urges the valve body towards one of the valve seats.

Thus, according to the invention, the plunger body is subdivided into individual, geometrically simple, separate segments having different dimensions and being guided in those housing parts which are assigned to them according to their function. Since the flanking segments are formed as support pistons which have the same piston face and the cylinders accommodating the respective support pistons are chargeable from a pressure conduit with a high-pressure fluid, the individual segments forming the plunger body are pressed to one another by the fluid pressure and are thus prevented from moving axially relative to one another. Since the system is pressure-equalized, the multi-segment plunger body may be reciprocated as a unitary structure by small forces during the switching steps. Switching of the valve does not generate any pressure forces at the valve body. Such forces could have an adverse effect on the switching conditions, such as a feedback of pressure waves at the valve body, oscillations of the valve body during switching and the like.

According to an advantageous feature of the invention, the plunger part which constitutes the valve body is formed by at least one valve ball. According to a further advantageous feature of the invention, the plunger segments constituting the control piston and the support pistons are formed by cylindrical bodies. These configurations have the advantage that for the plunger segments commercially available roller bearing bodies may be used. Such components have a high degree of form-retaining stability as well as superior strength and material properties. They are mass-manufactured items and thus may be purchased at favorable prices in desired dimensions.

According to a further advantageous feature of the invention the housing is composed of at least two axially adjoining parts. The parting plane between two adjoining housing parts thus extends transversely to the motion path of the plunger and is situated in a transitional region where the diameter of the axial housing cavity changes. This feature significantly simplifies the manufacture of the housing because the individual chambers and cylindrical spaces may be provided in the housing as through bores which, if required, may be made as stepped bores without difficulty.

In accordance with yet another advantageous feature of the invention, stroke-adjusting washers may be inserted into the valve chamber and/or the control chamber in alignment with parting planes of adjoining housing parts. This feature provides the possibility to construct also the housing from standard components and to adapt the plunger stroke to the individual requirements by inserting stroke-adjusting washers of different thicknesses.

According to a further feature of the invention a stroke-adjusting body is inserted between two adjoining plunger segments. The stroke-adjusting body may be an additional body in case an already present plunger segment cannot be readily changed in its length.

According to another advantageous feature of the invention the housing of the hydraulic valve forms a component of a fuel injection nozzle assembly. The supply conduit leading to the valve chamber, together with a servo-pressure chamber for the nozzle needle piston and the cylinders accommodating the respective support pistons are in communication with a conduit carrying high-pressure fuel. Further, the control conduit leading to the control cylinder is coupled with a hydraulic actuator. This arrangement provides the possibility of integrating the hydraulic control valve according to the invention as a servovalve in a fuel injection nozzle.

DESCRIPTION OF THE PREFERRED EMBODIMENTS

Figure 1:
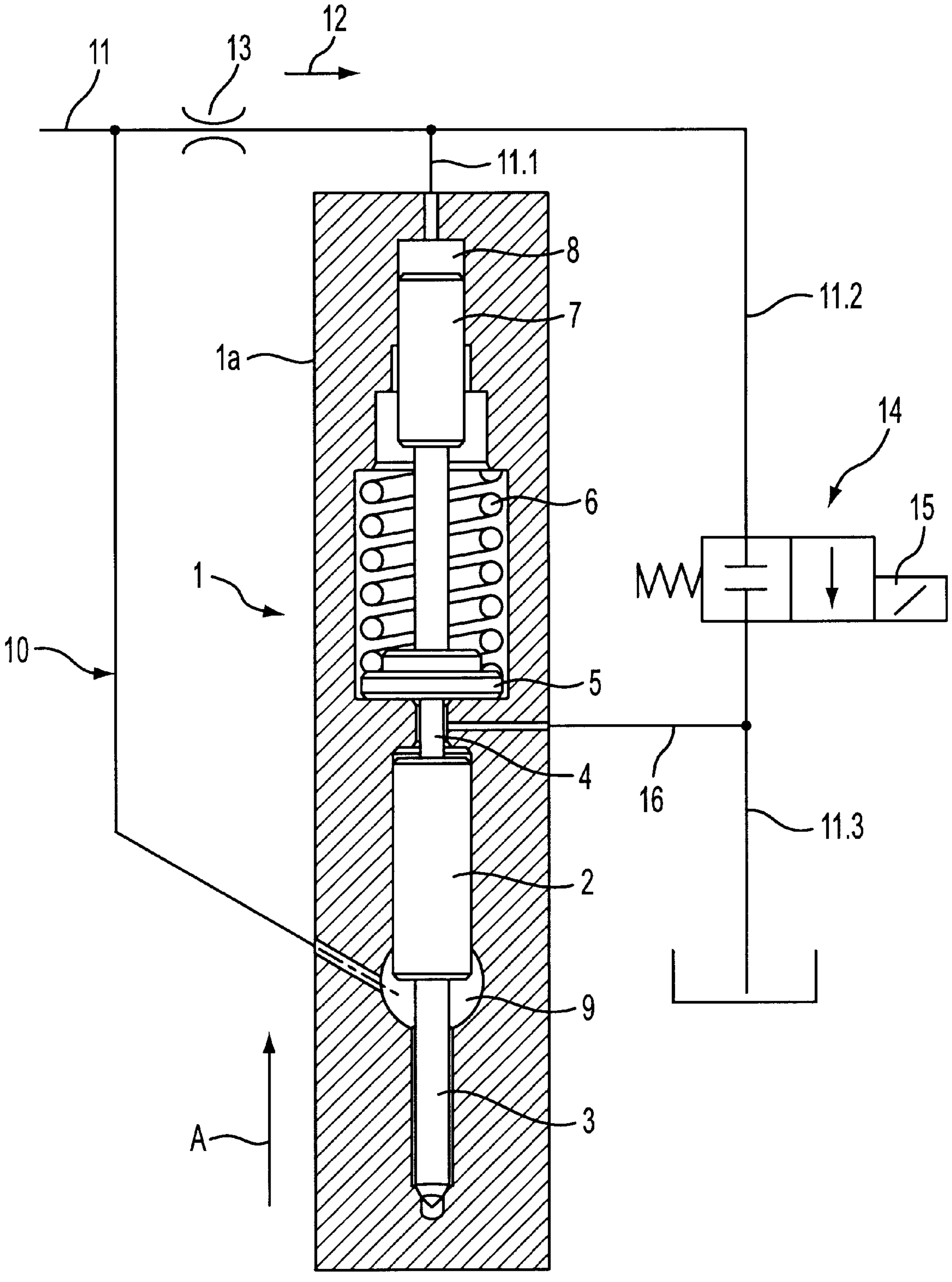
FIG. 1 is a schematic axial sectional view of a high-pressure injection valve controlled by a symbolically shown 2/2-way hydraulic control valve.

FIG. 1 illustrates the basic hydraulic circuit diagram associated with a 2/2-way control valve. The arrangement is a servocontrol circuit for actuating a setting member 1 which, in the present example, is a high-pressure fuel injection valve essentially formed of an only schematically shown housing 1*a* in which a nozzle needle 3 is guided. The nozzle needle 3, shown in its closed position, is affixed to a nozzle needle piston 2 which, by means of a pressure plate 5 provided with a shank 4, is coupled with a closing spring 6, urging the nozzle needle 3 into its closed position. The pressure plate 5 is further coupled with a servopiston 7 whose radial piston face approximately corresponds to that of the nozzle needle piston 2 oriented towards the nozzle needle 3. The servopiston 7 is guided in a cylinder 8 formed in the valve housing 1*a*.

The transitional zone between the nozzle needle 3 and the nozzle piston 2 is located in a pressure chamber 9 communicating with a pressure conduit (rail) 11 by means of a high-pressure supply conduit 10. The cylinder 8 too, is connected with the conduit 11 by a branch conduit 11.1. A throttle 13 is arranged in the high pressure conduit 11 upstream of the branch 11.1 as viewed in the flow direction of fluid (arrow 12). A branch conduit 11.2 leads to a hydraulic control valve 14 which, in the present example, is designed as a 2/2-way valve and is connected by means of a discharge conduit 11.3 with the depressurized part of the fluid pressure supply. The 2/2-way valve is operated (switched) by means of an actuator 15. A leakage conduit 16, through which leakage fluid is removed from the space between the pressure plate 5 and the nozzle piston 2, merges into the discharge conduit 11.3.

When the control valve 14 is closed, as shown symbolically in FIG. 1, the closing spring 6 presses the nozzle needle 3 against its seat thus closing the injection nozzle opening. Since both in the pressure chamber 9 and in the cylinder 8 high pressure prevails, the valve is at least partially pressure-equalized.

If the valve 14 is actuated and thus establishes communication between the conduits 11.2 and 11.3, the pressure in the conduit 11.2 drops and thus, the pressure in the cylinder 8 is likewise reduced due to the upstream-arranged throttle 13. As a result, the fluid pressure in the chamber 9 lifts the nozzle piston 2 against the force of the closing spring 6, whereby the nozzle needle opens the injection opening. If subsequently the control valve 14 is closed, high pressure builds up very rapidly in the cylinder 8, so that the force of the closing spring 6 is sufficient for closing the valve.

Figure 2:
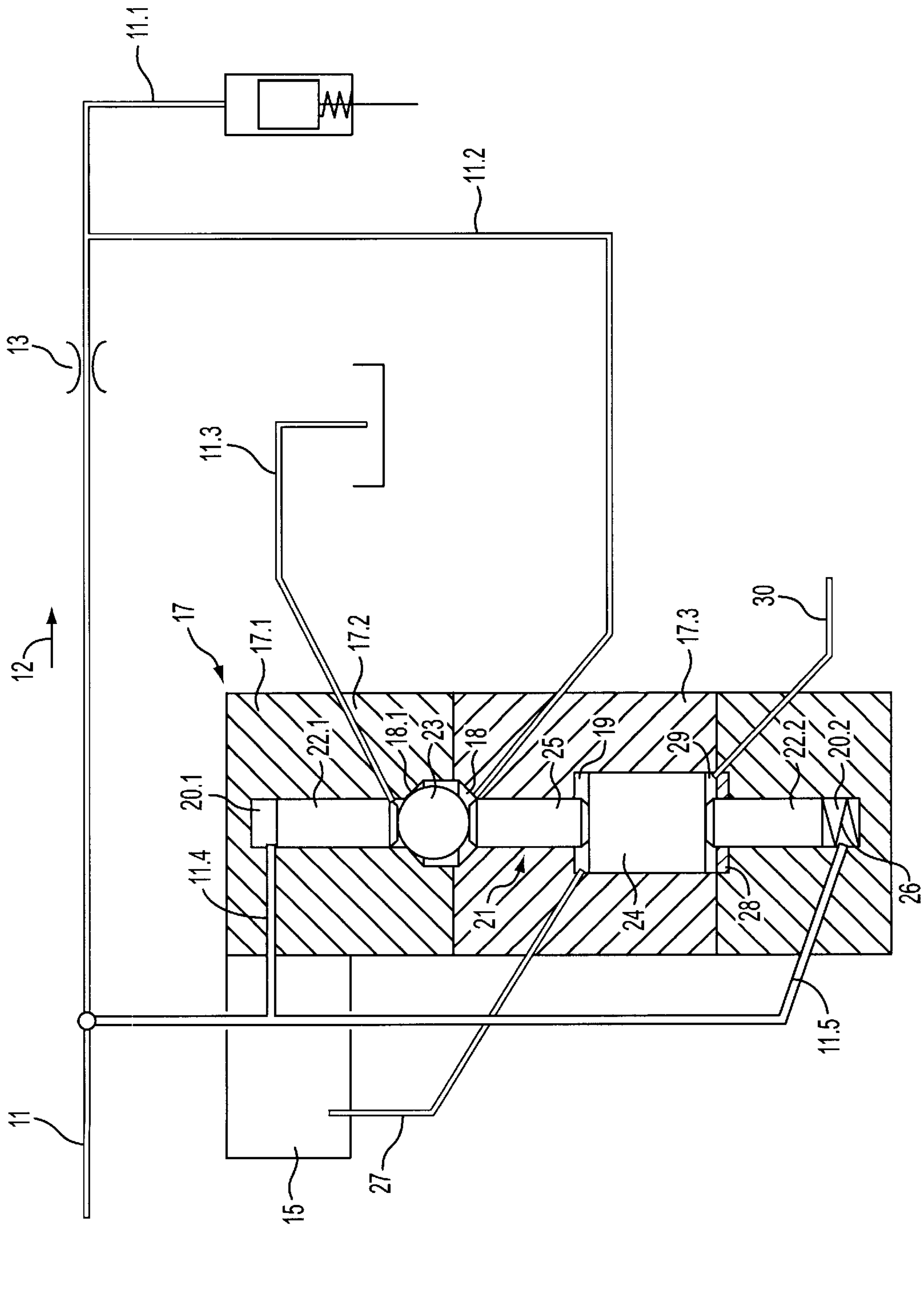
FIG. 2 is an axial sectional view of a 2/2-way hydraulic control valve according to a preferred embodiment of the invention.

FIG. 2 shows a structural embodiment of the hydraulic control valve 14 according to the invention. A housing 17 which is composed of housing parts 17.1, 17.2 and 17.3 and defines a cavity composed of a valve chamber 18, a control cylinder 19 as well as end cylinders 20.1 and 20.2 at opposite ends of the valve. The cavity accommodates for reciprocation a plunger body 21 which is formed of several loosely contacting, end-to-end disposed, separate plunger segments. The plunger segments of the plunger body 21 in the present example are two cylindrical support pistons 22.1 and 22.2 forming the opposite ends of the plunger body 21, a valve ball 23, a cylindrical control piston 24 and a cylindrical bar 25 disposed between the control piston 24 and the valve ball 23. The control piston 24 has a significantly greater effective piston face than the support pistons 22.1, 22.2 and the valve body 23. The cylindrical bar 25 has the same diameter as the two support pistons 22.1 and 22.2. A spring 26 disposed in the cylinder 20.2 presses, with the intermediary of the plunger segments 22.2, 24 and 25, the valve ball 23 against a valve seat 18.1 (that is, a conical wall portion of the chamber 18). The end cylinders 20.1 and 20.2 are in communication with the high-pressure conduit 11 of the system by means of corresponding branch conduits 11.4 and 11.5, so that by means of the pressure affecting both support pistons 22.1 and 22.2, the individual segments forming the plunger body 21 are pressed to one another. Since pressure equilibrium prevails, the force of the spring 26 is sufficient to maintain the valve body 23 in its closed position.

At its side remote from the closing spring 26 the control cylinder 19 is in communication with the actuator 15 by means of a control conduit 27. As controlled by the actuator 15, the control conduit 27 may charge the control cylinder 19 with pressurized fluid. Such a pressure moves the control piston 24 and thus the plunger body 21 only with a small switching force against the force of the closing spring 26 so that the valve ball 23 is lifted from its seat 18.1. The maximum stroke of the control piston 24 may be limited by an inserted spacer disk (washer) 28; this limits the stroke of the valve ball 23 as well.

In the illustrated embodiment of the 2/2-way control valve the valve ball 23 is disposed in the valve chamber 18 such that it is situated between the two ports where the pressure conduit 11.2 and the discharge conduit 11.3 communicate with the valve chamber 18. The discharge conduit 11.3 moves the depressurized fluid back into a supply sump.

The pressure conduit 11 is connected to a setting member 1, for example, the cylinder chamber 8 of the fuel injection valve shown in FIG. 1. Further, the throttle 13 shown in FIG. 1 is disposed in the pressure conduit 11, upstream of the branch-off location of the conduit 11.2, as viewed in the direction of the arrow 12. In the shown closed position the cylinder 8 of the setting means 1 is exposed to the high pressure prevailing in the pressure conduit 11. If the control cylinder 19 is charged with pressure from the control conduit 27, the valve ball 23 lifts off its seat 18.1, whereupon pressurized fluid may flow through the conduit 11.2 and the discharge conduit 11.3 so that, under the effect of the throttle 13, the pressure in the setting means system is dropping and the needle valve 3 of the setting means 1, because of the own setting forces, may move in the direction of the arrow A. As soon as the control pressure is removed from the control cylinder 19 through the control conduit 27, the valve ball 23 assumes its closed position at the valve seat 18.1, so that again high pressure builds up in the chamber 8 of the setting means 1 through the pressure conduit 11.2, and thus the nozzle needle 3 of the setting means 1 is moved in a direction opposite the arrow A.

As shown in the drawings, the plunger body has, as viewed as a whole, a complex geometrical shape, because of the required diametrical variations along its axis. Such a complex shape, however, may be obtained in a simple manner according to the invention by dividing it into separate, individual, geometrically simple bodies such as a ball, a cylinder or, if needed, a conical body as well. The use of cylindrical bodies and spherical bodies furthermore has the advantage that commercially available structural elements manufactured in the ball bearing industry may be used; in this manner, the individual bodies which form the plunger body 21 may be selected from a great variety of diameters and lengths as well as configurational combinations. If, for example, for a certain application a conical body is required, such a configuration may be simply obtained by chamfering a cylindrical body. Such a procedure is significantly simpler than providing the same shape on a conventional, unitary plunger body.

Figure 3:
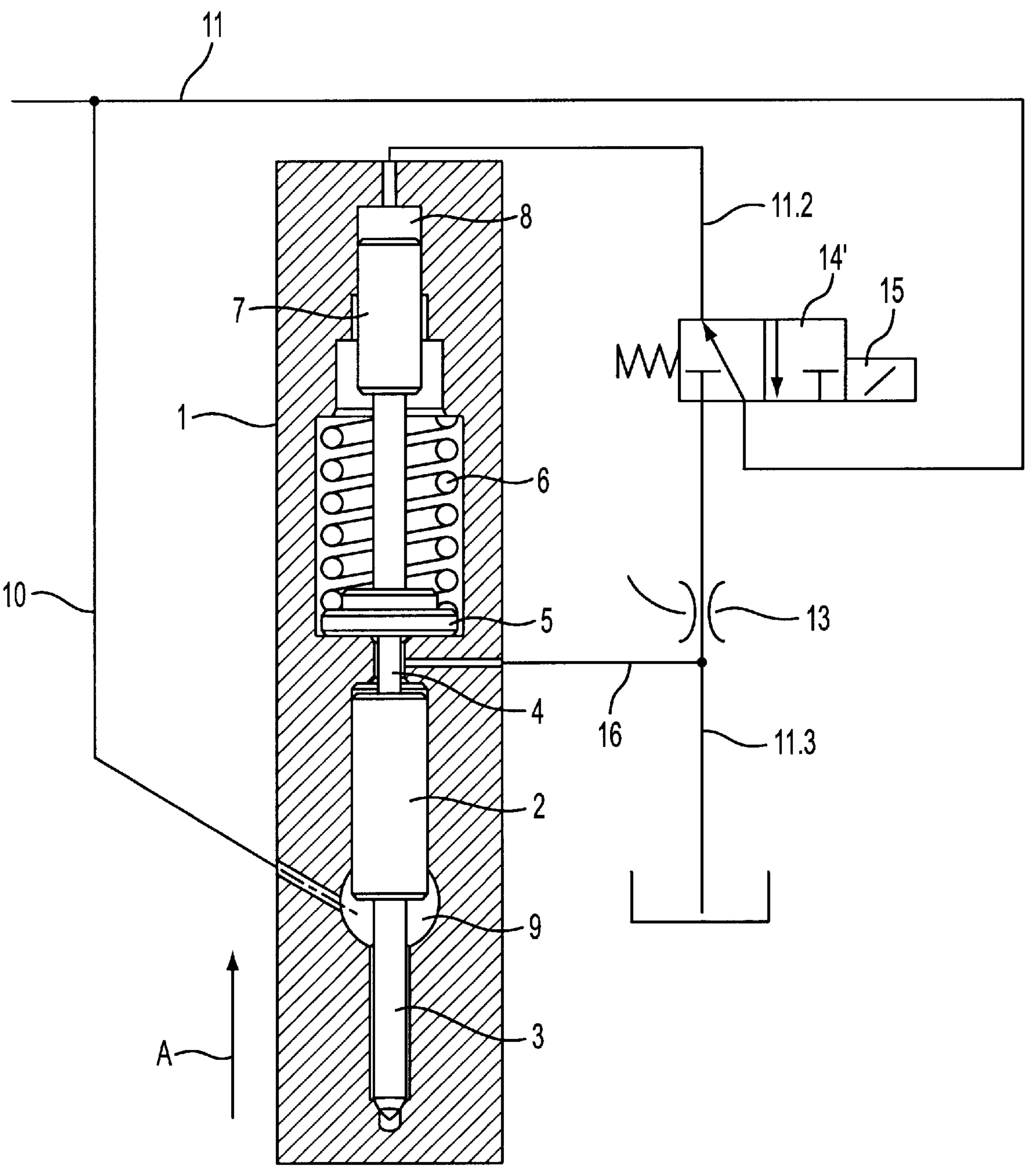
FIG. 3 is a schematic axial sectional view of a high-pressure injection valve controlled by a symbolically shown 3/2-way hydraulic control valve.

FIG. 3 shows the basic hydraulic circuit for the fuel injection nozzle 1 which is controlled by a symbolically illustrated 3/2-way control valve 14'. By means of the control valve 14' the cylinder chamber 8 is, in the shown closed position, charged with high-pressure fuel from the conduit 11.2. If the control valve 14' is actuated, the conduit 11.2 is coupled by means of the control plunger of the control valve 14' with the discharge conduit 11.3 and is thus depressurized, so that the high pressure affecting the nozzle needle piston 2 lifts the nozzle needle 3 from its seat. If the control valve 14' is switched over, the cylinder chamber 8 is again charged with high pressure, so that the same pressure prevails as in the pressure chamber 9, and the valve spring 6 rapidly moves the nozzle needle 3 against its seat into the closed position.

Figure 4:
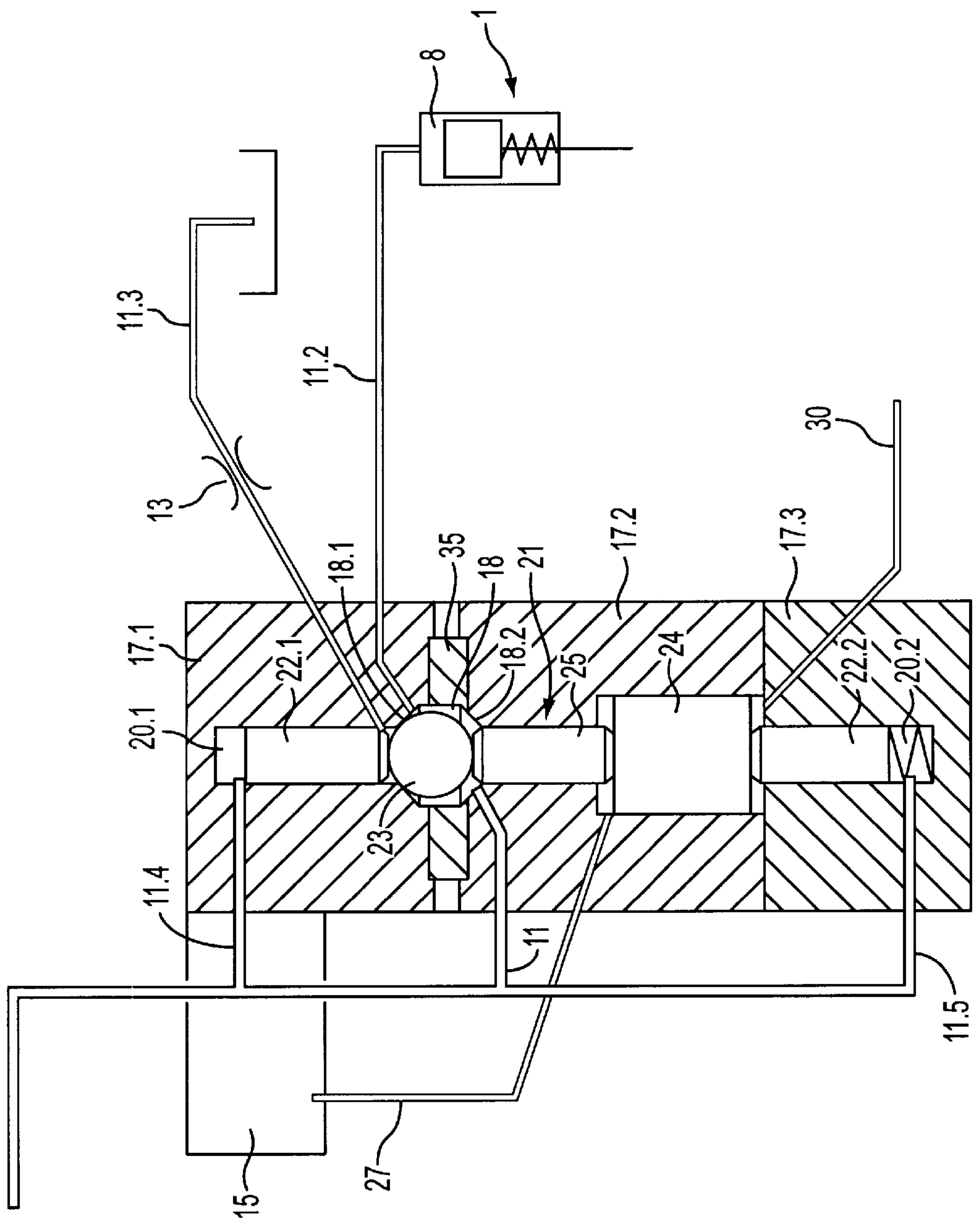
FIG. 4 is an axial sectional view of a 3/2-way hydraulic control valve according to a preferred embodiment of the invention.

FIG. 4 shows the structure of a 3/2-way valve composed of individual plunger segments according to the invention. The difference between the structure of FIG. 2 and that of FIG. 4 resides essentially in that the conduit 11.2 leading to the cylinder chamber 8 of the setting means 1 merges centrally into the valve chamber 18. The upper end of the valve chamber 18 is provided with a valve seat 18.1 to receive the valve ball 23 for blocking the discharge conduit 11.3.

The pressure conduit 11 opens into the valve chamber 18 at the high-pressure side, on the other side of the valve ball 23. The valve chamber 18 is provided with a valve seat 18.2 which is axially spaced from the valve seat 18.1, so that the high-pressure conduit 11 is blocked when the valve ball 23 is seated on the valve seat 18.2. In accordance with the arrangement of FIG. 2, from the high-pressure conduit 11 pressure conduits 11.4 and 11.5 extend to the cylinder chambers 20.1 and 20.2 from which, as described before, the individual plunger segments of the plunger body are pressed together.

In the illustrated operational position of FIG. 4, the cylinder chamber 8 of the setting means 1 is charged with high pressure from the high pressure conduit 11 and the supply conduit 11.2. If the control cylinder 19 is charged with pressure from the control conduit 27, the plunger body 21 is shifted downwardly, whereupon the valve ball 23 assumes its position on the valve seat 18.2 and thus the high pressure conduit 11 is blocked towards the valve chamber 18. Since, at the same time, the valve ball 23 moves away from its valve seat 18.1, the pressure drops in the cylinder 8 by virtue of the outflow of the pressurized fluid through the discharge conduit 11.3, so that the valve needle 3 of the setting means 1 is moved in the direction of the arrow A. By means of a spacer washer 35 disposed between the housing parts 17.1 and 17.2 the stroke of the plunger body 21 may be preset.

Figure 5:
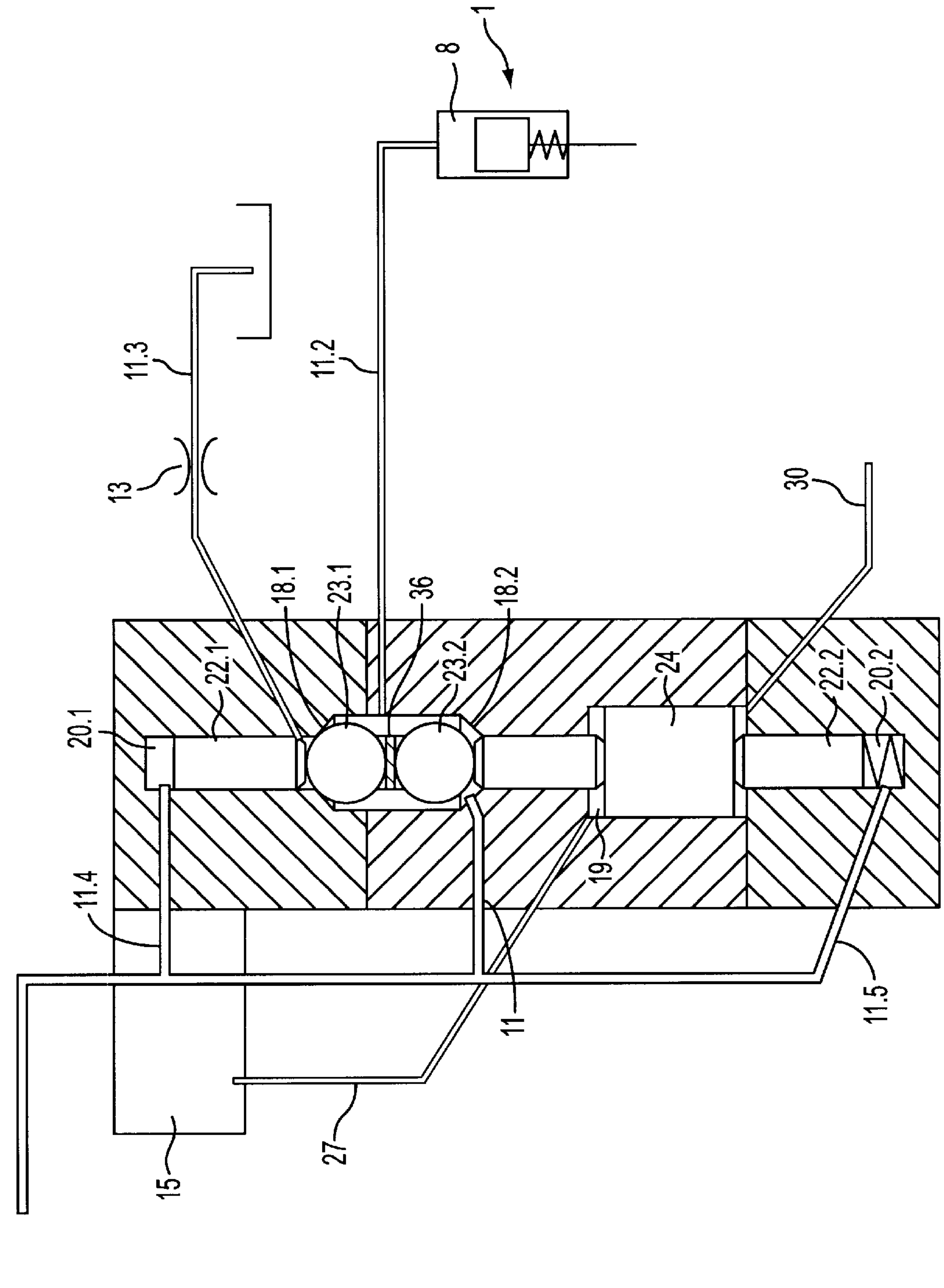
FIG. 5 is an axial sectional view of a variant of the FIG. 4 construction.

FIG. 5 shows a variant of the embodiment illustrated in FIG. 4. In the structure according to FIG. 5, in the valve chamber 18 two valve balls 23.1 and 23.2 are provided, between which a tubular spacer disk 36 is disposed to set the distance of the two valve balls 23.1 and 23.2 relative to one another. In this manner the total stroke of the composite valve assembly 23.1, 23.2 may be changed. In other respects the structure and function of the FIG. 5 embodiment correspond to those described in connection with FIG. 4.

In all the embodiments of the hydraulic control valve according to the invention the chamber 29 which is situated on that side of the control piston 24 that is oriented away from the control cylinder 19, a leakage conduit 30 is provided which communicates, in a manner not shown, with the discharge conduit 11.3.

Figure 6:
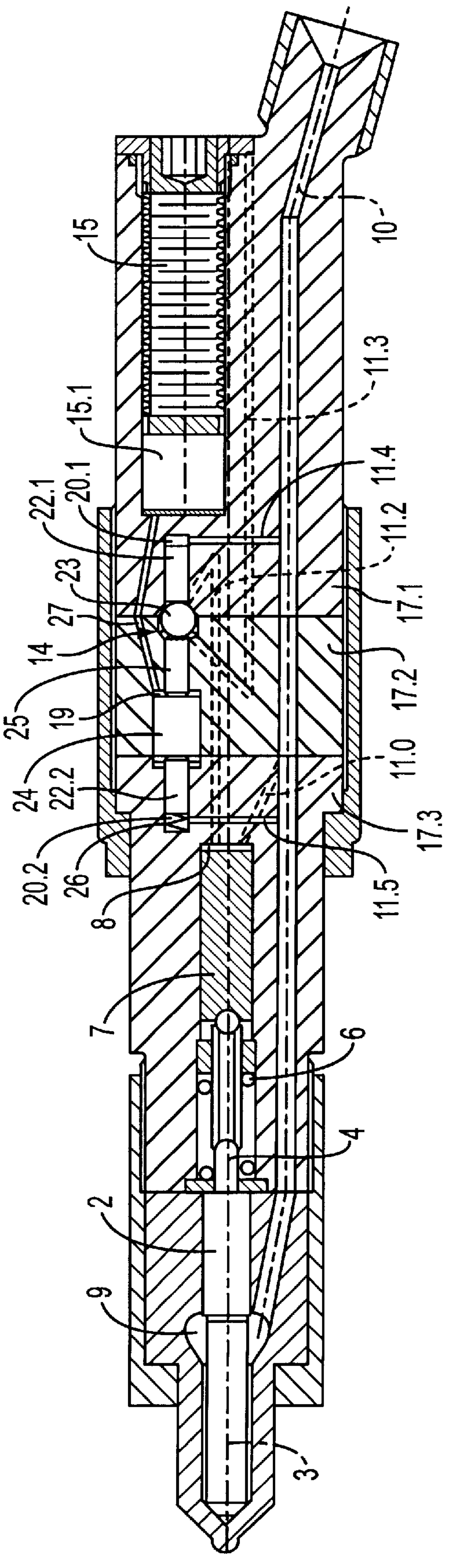
FIG. 6 is an axial sectional view of a hydraulic control valve according to the invention, incorporated in a high-pressure fuel injection valve.

FIG. 6 illustrates a high-pressure injection nozzle (fuel injection valve) which is designed for a vehicle engine and in which the 2/2-way control valve described in conjunction with FIG. 2 is integrated. The hydraulic circuit and its switching operation correspond to that described in conjunction with FIG. 1. The housing 17.1, 17.2, 17.3 of the control valve at the same time forms a housing part of the fuel injection valve. In the description which follows, corresponding components will be referred to with the same reference numerals as those used in FIGS. 1 and 2.

In the embodiment of FIG. 6 the high-pressure conduit 11 serves both for the pressure supply for the switching elements and for supplying the fuel to be injected by the injection nozzle. The latter is in communication by means of the branch conduit 11.0 with the cylinder 8 and charges the servopiston 7 with the pressure prevailing in the high-pressure conduit 11. The supply conduit 11.2, extending from the cylinder 8, opens into the valve chamber 18 and is blocked in the illustrated position by the valve ball 23. On the other side of the valve ball 23 the discharge conduit 11.3 extends from the valve chamber 18 and communicates with the fuel tank by a fuel return conduit.

The actuator 15 for the control valve 14 is a piezoelectric device which exerts a force on a transmitter piston 15.1 guided in a cylinder 15.2 which is also charged with fuel and which communicates with the control cylinder 19 by means of the control conduit 27.

When the actuator 15 is activated, the transmission piston 15.1 is shifted leftward as viewed in FIG. 6 to thus drive liquid through the control conduit 27 into the control cylinder 19. As a result, the control piston 24 is shifted against the force of the resetting spring 26 so that liquid may flow through the conduit 11.2 from the cylinder 8. Since in the supply conduit 11.1 a non-illustrated throttle is arranged, by means of the pressure prevailing in the pressure chamber 9 the nozzle needle piston 2 is lifted and the nozzle needle 3 is opened. As soon as the actuator 15 is de-energized, the transmitter piston 15.1 moves toward the right, so that the resetting spring 26 may move the plunger body composed of individual segments again into the closed position and, accordingly, in the cylinder 8 again a high pressure may build up to ensure that the nozzle needle 3 closes.

As described before in connection with FIG. 2, the cylinders 20.1 and 20.2 flanking the segmented plunger body are pressurized from the respective branch conduits 11.4 and 11.5 extending from the high-pressure conduit 11 for pressing together the individual segments of the plunger body.

The use of the invention is not limited to the described fuel injection valve. A control valve according to the invention may be used in a hydraulic control circuit as an individual structural component or as an integrated component for a wide variety of applications.

Figure 7:
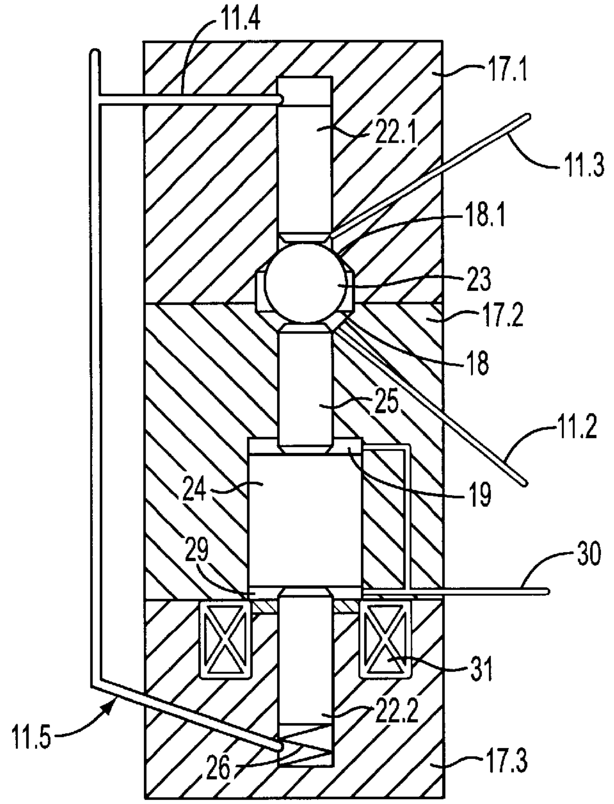
FIG. 7 is an axial sectional view of the embodiment shown in FIG. 2, operated by a magnetic actuator.

FIG. 7 shows a variant of FIG. 2, usable in other embodiments as well. Instead of a hydraulic force exerted on the control piston 24, in the arrangement according to FIG. 7 an annular coil 31 is arranged in the housing part 17.3 to exert, when energized, an electromagnetic force on the control piston 24 which thus acts as an armature. Thus, when the coil 31 is energized, the control piston 24 is attracted thereto and, as a result, the valve ball 23 is lifted from its seat and permits a flow of fluid. After de-energization of the coil 31, the valve ball 23 is once again pressed by the spring 26 into its seat thus blocking the flow of liquid. The control piston 24 and the annular coil 31 together form an electromagnetic actuator in which the selection of material for the control piston 24 may optimize the system with respect to its function.

Figure 8:
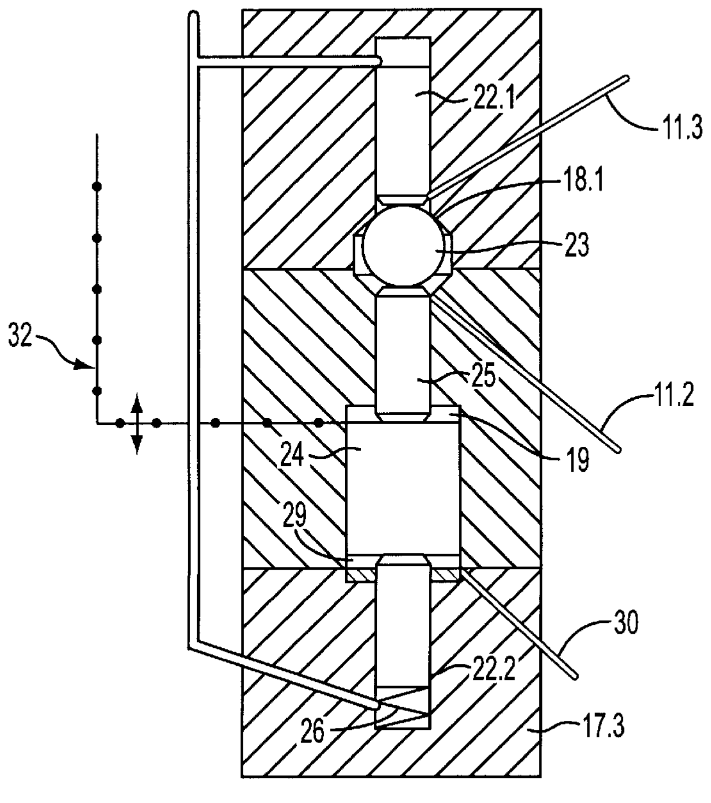
FIG. 8 is an axial sectional view of the construction shown in FIG. 2, operated by a mechanical device.

In the embodiment according to FIG. 8 the control piston 24 is mechanically actuated by a setting drive shown in dash-dotted lines 32.

It will be understood that the above description of the present invention is susceptible to various modifications, changes and adaptations, and the same are intended to be comprehended within the meaning and range of equivalents of the appended claims.

What is claimed is:

1. A hydraulic control valve comprising (a) a valve housing having an axis and defining
 (1) a valve chamber having first and second axially spaced valve seats having identical diameters;
 (2) a control cylinder;
 (3) first and second end cylinders; said valve chamber, said control cylinder and said first and second end cylinders being axially arranged in a series and forming a cavity; said first and second end cylinders together flanking said valve chamber and said control cylinder;
 (4) a first pressure conduit communicating with said valve chamber;
 (5) a second pressure conduit communicating with said first end cylinder;
 (6) a third pressure conduit communicating with said second end cylinder;
 (7) a control conduit communicating with said control cylinder; and
 (8) a discharge conduit communicating with said valve chamber;

(b) a plunger body accommodated for axial displacements in said cavity and being composed of separate plunger body segments having at least two different geometrical shapes and being loosely axially serially disposed in an end-to-end relationship; said separate plunger body segments including
 (1) a valve body disposed in said valve chamber for selectively assuming a seated position in said first and second valve seats and for controlling communication between said discharge conduit and said first pressure conduit through said valve chamber;
 (2) a control piston disposed in said control cylinder;
 (3) a first support piston disposed in said first end cylinder and exposed to pressure from said second pressure conduit; and
 (4) a second support piston disposed in said second end cylinder and exposed to pressure from said third pressure conduit; said first and second support pistons having identical diameters; the pressures supplied by said second and third pressure conduits to said first and second end cylinders form means for urging together said valve body segments into a unitary structure for movement as a one-piece component; and (c) a closing spring supporting said second support piston and urging said valve body towards one of said valve seats.

2. The hydraulic control valve as defined in claim 1, wherein the plunger body segment constituting said valve body comprises at least one valve ball.

3. The hydraulic control valve as defined in claim 1, wherein the plunger body segments constituting said control piston and said first and second support pistons are cylindrical bodies.

4. The hydraulic control valve as defined in claim 1, wherein said housing is formed of a plurality of housing segments separated from one another by parting planes oriented transversely to said axis.

5. The hydraulic control valve as defined in claim 4, wherein said plunger body has different diameters along said axis and further wherein said parting planes intersect transition zones between plunger body portions of different diameters.

6. The hydraulic control valve as defined in claim 4, further comprising a stroke adjusting washer disposed in said valve chamber in alignment with one of said parting planes.

7. The hydraulic control valve as defined in claim 4, further comprising a stroke adjusting washer disposed in said control cylinder in alignment with one of said parting planes.

8. The hydraulic control valve as defined in claim 1, in combination with a fuel injection valve forming a unitary construction with said hydraulic control valve; said fuel injection valve comprising (a) a housing constituted by said housing of said hydraulic control valve;

(b) a pressure chamber; said first pressure conduit communicating with said pressure chamber;

(c) a nozzle needle piston received for reciprocation in said pressure chamber; and (d) a hydraulic actuator connected to said control conduit; and further wherein said second and third pressure conduits are adapted to communicate with a conduit carrying fuel under high pressure.

9. The hydraulic control valve as defined in claim 1, further comprising a stroke adjusting washer disposed in said control cylinder.

10. The hydraulic control valve as defined in claim 1, wherein the geometrical shape of one of said valve body segments is spherical and the geometrical shape of another of said valve body segments is cylindrical.

11. A hydraulic control valve comprising (a) a valve housing having an axis and defining (1) a valve chamber having first and second axially spaced valve seats having identical diameters;

(2) a control cylinder;

(3) first and second end cylinders; said valve chamber, said control cylinder and said first and second end cylinders being axially arranged in a series and forming a cavity; said first and second end cylinders together flanking said valve chamber and said control cylinder;

(4) a first pressure conduit communicating with said valve chamber;

(5) a second pressure conduit communicating with said first end cylinder;

(6) a third pressure conduit communicating with said second end cylinder;

(7) a discharge conduit communicating with said valve chamber;

(b) a plunger body accommodated for axial displacements in said cavity and being composed of separate plunger body segments having at least two different geometrical shapes and being loosely axially serially disposed in an end-to-end relationship; said separate plunger body segments including (1) a valve body disposed in said valve chamber for selectively assuming a seated position in said first and second valve seats and for controlling communication between said discharge conduit and said first pressure conduit through said valve chamber;

(2) a control piston disposed in said control cylinder;

(3) a first support piston disposed in said first end cylinder and exposed to pressure from said second pressure conduit; and (4) a second support piston disposed in said second end cylinder and exposed to pressure from said third pressure conduit; said first and second support pistons having identical diameters; the pressures supplied by said second and third pressure conduits to said first and second end cylinders form means for urging together said valve body segments into a unitary structure for movement as a one-piece component;

(c) force-exerting control means for exerting a setting force directly on said control piston; and (d) a closing spring supporting said second support piston and urging said valve body towards one of said valve seats.

12. The hydraulic control valve as defined in claim 11, wherein said force-exerting control means comprises an electromagnetic actuator including a magnet coil and an armature operatively coupled to said armature; said armature being constituted by said control piston.

* * * * *

UNITED STATES PATENT AND TRADEMARK OFFICE
CERTIFICATE OF CORRECTION

PATENT NO : 6,129,332
DATED : October 10, 2000
INVENTOR(S) : Martin Düsterhöft

It is certified that error appears in the above-identified patent and that said Letters Patent are hereby corrected as shown below:

On the title page, item [54], the title should read: --HYDRAULIC PLUNGER VALVE HAVING LOOSELY AXIALLY SERIALLY DISPOSED PLUNGER BODY SEGMENTS--.

Signed and Sealed this

Eighth Day of May, 2001

Attest:

*Nicholas P. Godici*

NICHOLAS P. GODICI

*Attesting Officer*

*Acting Director of the United States Patent and Trademark Office*